United States Patent [19]
Gochenour et al.

[11] Patent Number: 5,791,448
[45] Date of Patent: Aug. 11, 1998

[54] SEGMENTED CAM RINGS FOR AUTOMATIC SELF ADJUSTING CLUTCH

[75] Inventors: Daniel V. Gochenour; Mark Jennings, both of Auburn, Ind.

[73] Assignee: Eaton Corporation, Cleveland, Ohio

[21] Appl. No.: 725,783

[22] Filed: Oct. 4, 1996

[51] Int. Cl.⁶ .................................................. F16D 13/75
[52] U.S. Cl. ............................ 192/70.25; 192/111 A
[58] Field of Search ........................ 192/70.25, 89.24, 192/111 A

[56] References Cited

U.S. PATENT DOCUMENTS

| | | |
|---|---|---|
| 2,251,366 | 8/1941 | Miller et al. . |
| 5,320,205 | 6/1994 | Kummer et al. . |
| 5,419,418 | 5/1995 | Uenohara et al. . |
| 5,450,934 | 9/1995 | Maucher . |
| 5,513,735 | 5/1996 | Uenohara .......................... 192/111 A |
| 5,513,736 | 5/1996 | Mizukami ..................... 192/70.25 X |
| 5,566,804 | 10/1996 | Gochenour et al. ................. 192/70.25 |
| 5,634,541 | 6/1997 | Maucher ........................... 192/111 A |

*Primary Examiner*—Rodney H. Bonck
*Attorney, Agent, or Firm*—Dykema Gossett PLLC

[57] ABSTRACT

A clutch assembly with an automatically adjusting mechanism includes a clutch cover, a pressure plate, an actuating lever, a rotating cam ring, a stationary cam ring, and an adjusting spring disposed between the rotating cam ring and the clutch cover. The clutch cover has an axis of rotation. The pressure plate is concentric with the axis of rotation and has an engagement surface disposed opposite the clutch cover. The actuating lever is disposed between the clutch cover and the pressure plate. The rotating cam ring assembly is also concentric with the axis of rotation and includes a plurality of discrete arcuate incline segments, as well as a spring engagement feature fixed relative to at least one of the arcuate incline segments. The stationary cam ring is also concentric with the axis of rotation and is rotatably fixed relative to the clutch cover. The stationary cam ring has a backside in engagement with one of the pressure plate and the actuating lever. The stationary cam ring has a plurality of arcuate incline segments which are in axial engagement with the discrete incline segments of the rotating cam ring. Relative rotation between the rotating cam ring and the stationary cam ring in a first direction increases an effective thickness of the cover and the pressure plate. A torsional bias spring is disposed between the rotating cam ring and the clutch cover and biases the rotating cam ring relative to the stationary cam in a direction tending to increase the effective thickness of the pressure plate.

12 Claims, 5 Drawing Sheets

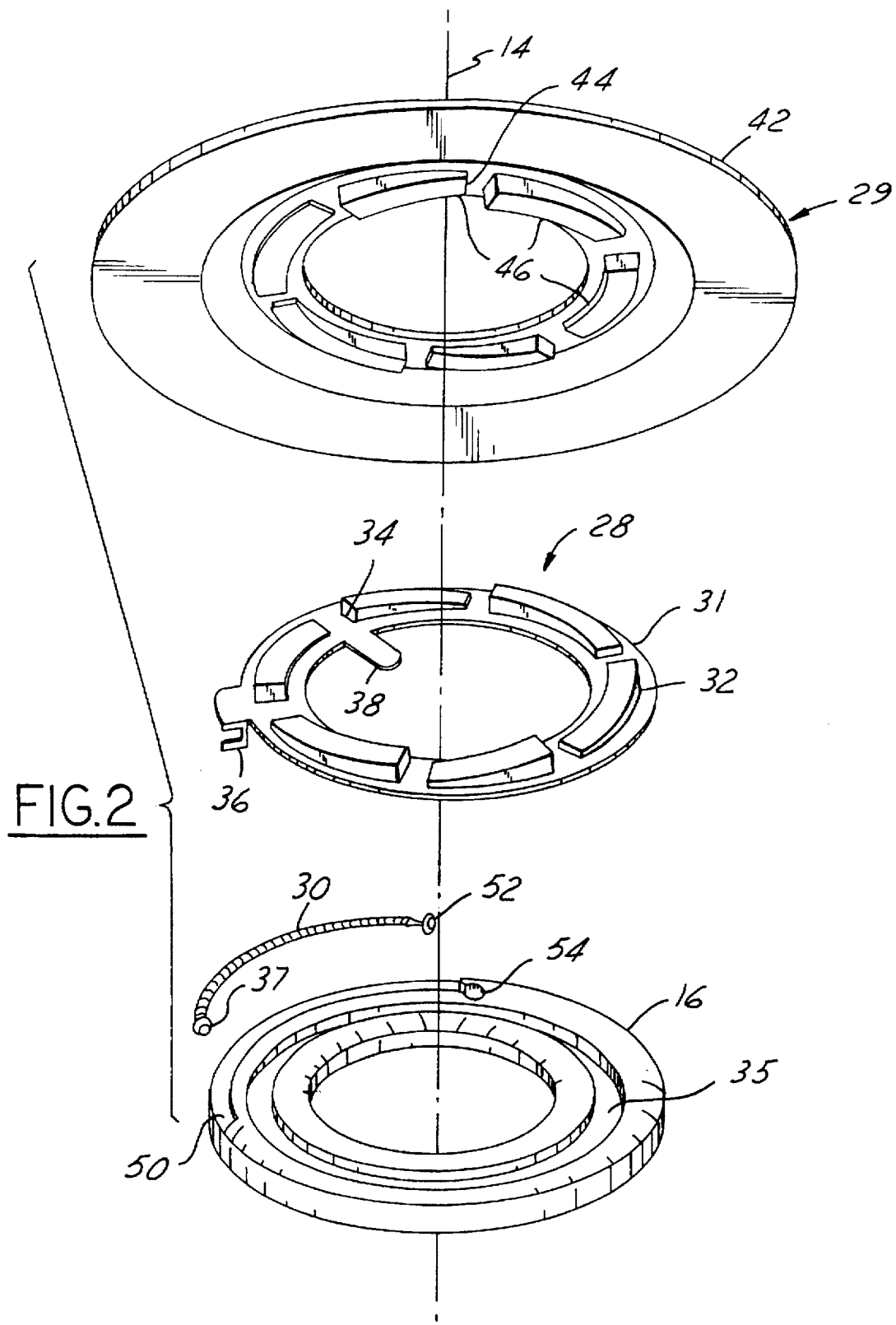

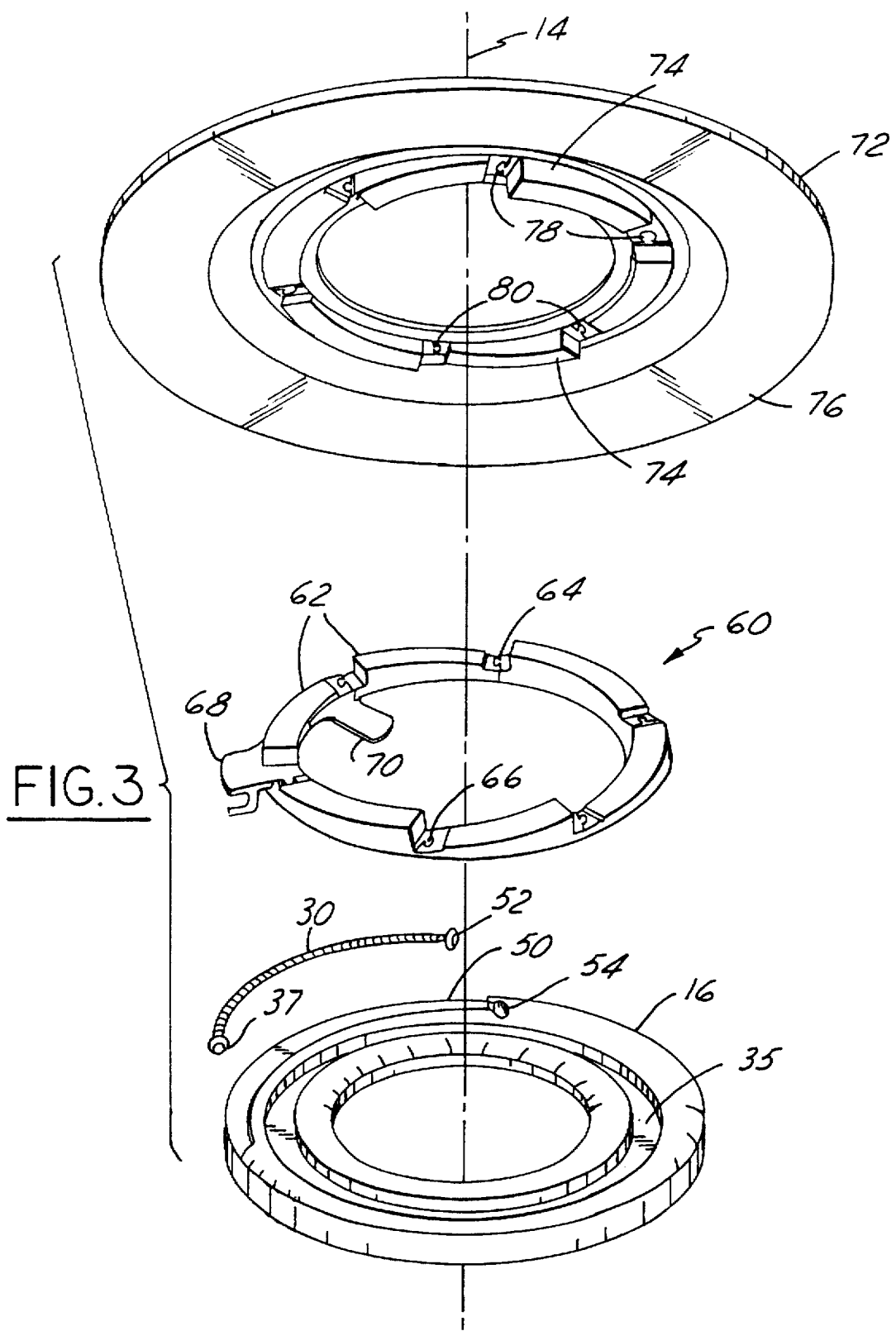

5,791,448

1

SEGMENTED CAM RINGS FOR AUTOMATIC SELF ADJUSTING CLUTCH

FIELD OF THE INVENTION

This invention is related to clutches for use between motor vehicle engines and transmissions, and more particularly to automatic self adjusting clutches employing cam rings.

BACKGROUND OF THE INVENTION

Automatically adjusting clutches employing a pair of opposed, circumferentially continuous cam rings are known. The cam rings are typically a one piece, unitary forming. A disadvantage of unitary cam rings is that they impose packaging limitations on the design of the clutch and the adjuster mechanism.

It is desired to form a cam ring using a plurality of discrete or individual segmented cam elements to enjoy the resultant packaging flexibility. The packaging flexibility will in turn enable optimization of the design and manufacturing of the clutch assembly.

While the basic concept of using a plurality of individual cam elements to form cams is known, the teachings of the prior art do not show arrangements for cam elements which provide the desired level of flexibility in the clutch design which would enable optimization of the design and manufacture of automatically adjusting clutch assemblies.

SUMMARY OF THE INVENTION

A clutch assembly with an automatically adjusting mechanism includes a clutch cover, a pressure plate, an actuating lever, a rotating cam ring, a stationary cam ring, and an adjusting spring disposed between the rotating cam ring and the clutch cover. The clutch cover has an axis of rotation. The pressure plate is concentric with the axis of rotation and has an engagement surface disposed opposite the clutch cover. The actuating lever is disposed between the clutch cover and the pressure plate. The rotating cam ring is concentric with the axis of rotation and includes a plurality of discrete arcuate incline segments, as well as a spring engagement feature fixed relative to at least one of the arcuate incline segments. The stationary cam ring is concentric with the axis of rotation and is rotatably fixed relative to the clutch cover. The stationary cam ring has a backside in engagement with one of the pressure plate and the actuating lever. The stationary cam ring has a plurality of arcuate incline segments which are in axial engagement with the discrete incline segments of the rotating cam ring. Relative rotation between the rotating cam ring and the stationary cam ring in a first direction increases an effective thickness of the cover and the pressure plate. A torsional bias spring is disposed between the rotating cam ring and the clutch cover and biases the rotating cam ring relative to the stationary cam in a direction tending to increase the effective thickness of the pressure plate.

The stationary and rotating cam rings are able to accommodate a variety of design configurations to provide increased manufacturing flexibility of the cam rings.

The invention can be best understood from the following specification and drawings of which the following is a brief description.

2

FIG. 2 is a perspective exploded view showing the cam rings and pressure plate of a first embodiment of the present invention.

FIG. 3 is an exploded perspective view of the pressure plate and cam rings of a second embodiment of the present invention.

Figure 4:
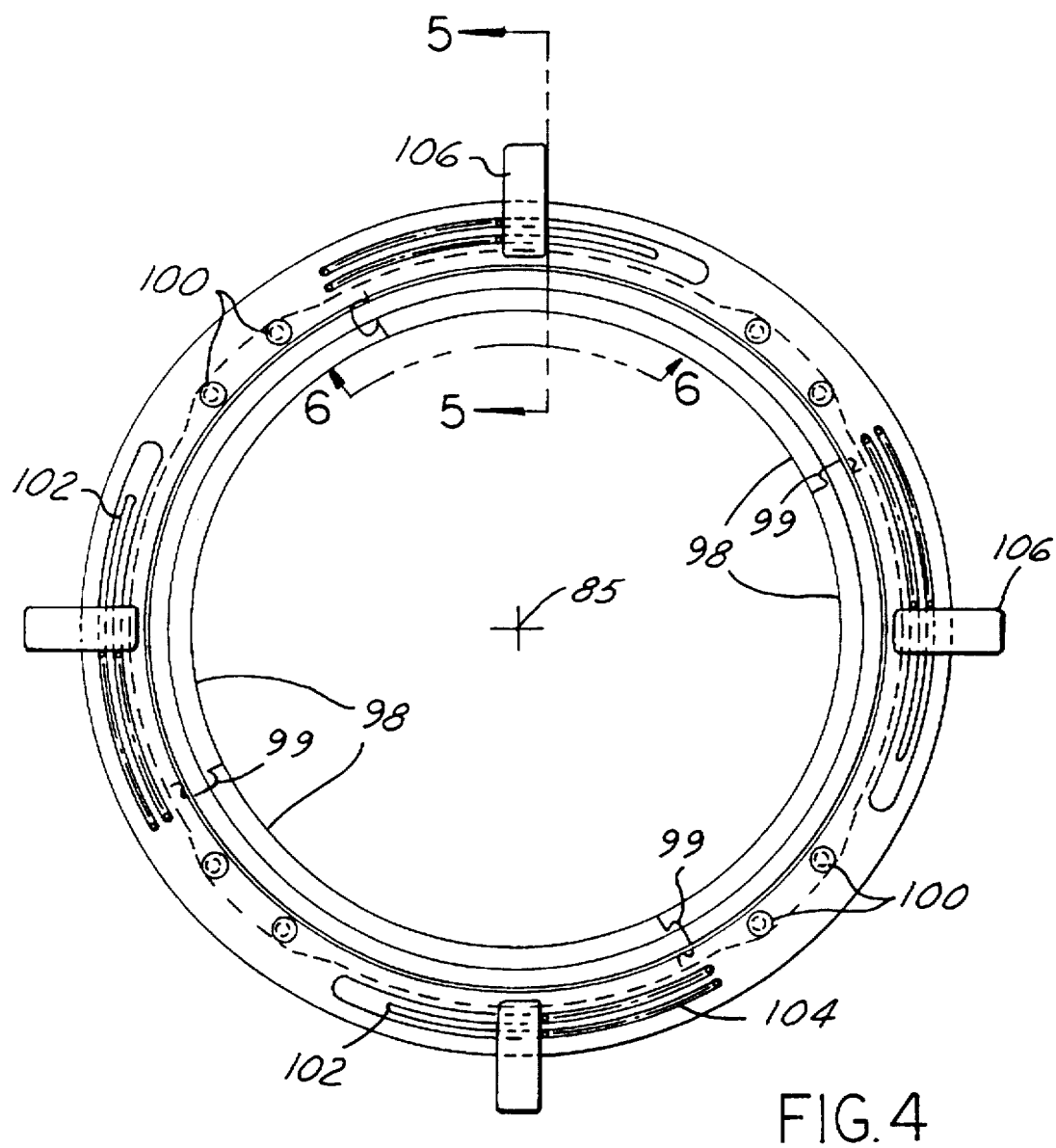

FIG. 4 is an end view of a third embodiment of a rotating cam ring.

Figure 5:
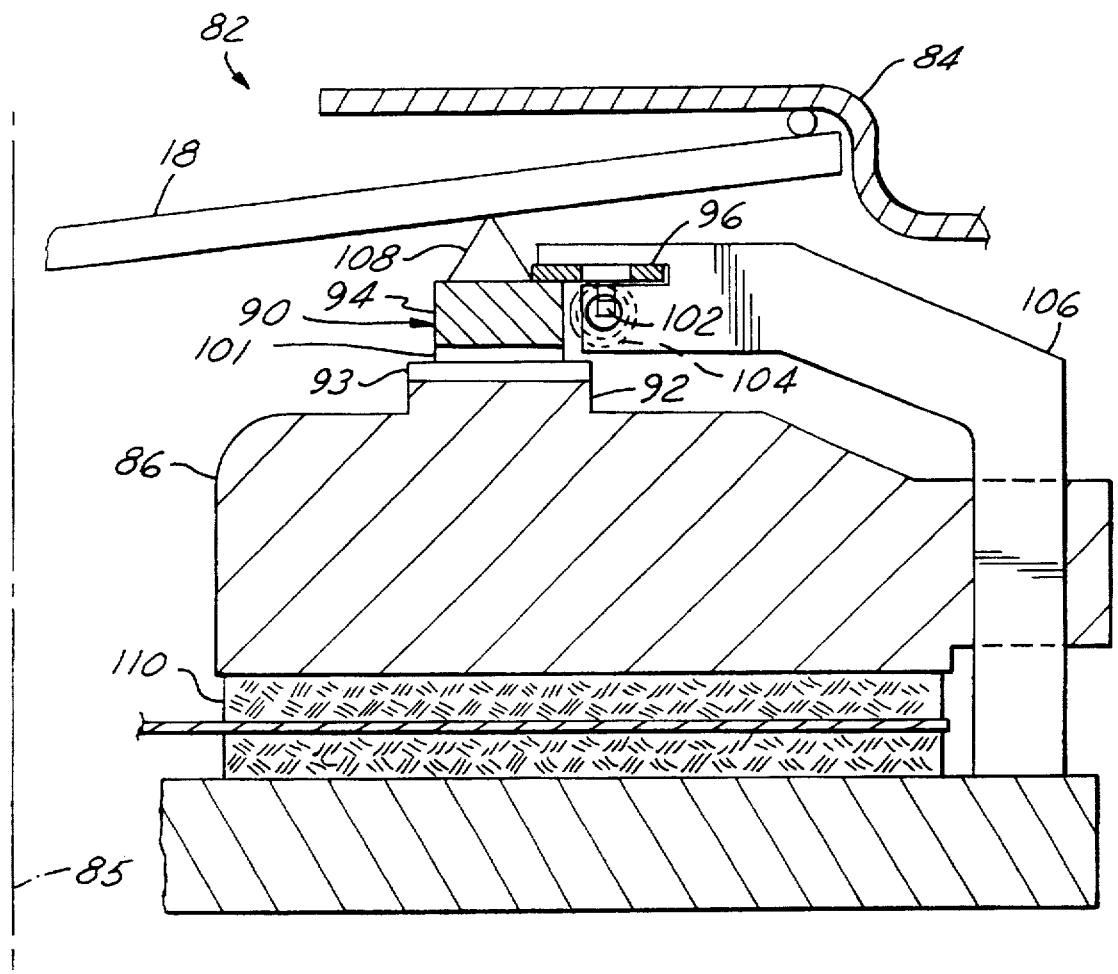

FIG. 5 is a sectional view of the rotating cam ring of FIG. 4 and other parts of a clutch assembly taken in the direction of arrows 5.

Figure 6:
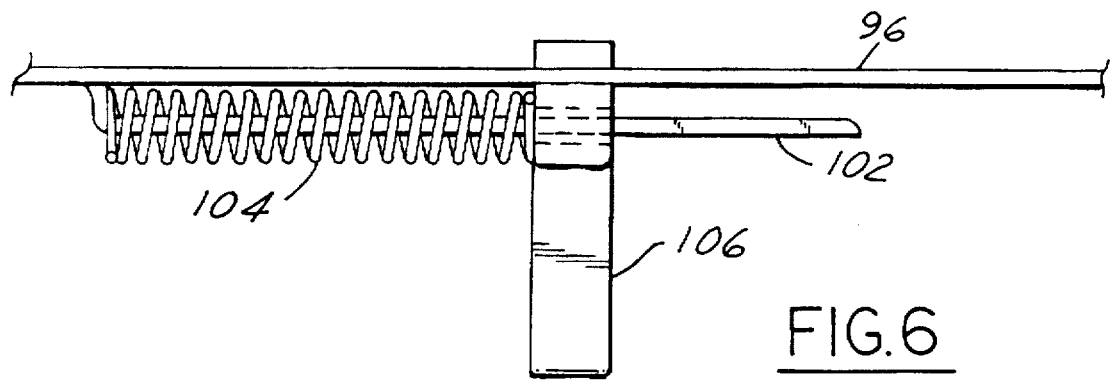

FIG. 6 is a broken out and enlarged view of a metal ring of FIG. 4 taken in the direction of arrows 6.

DESCRIPTION OF A PREFERRED EMBODIMENT

Figure 1:
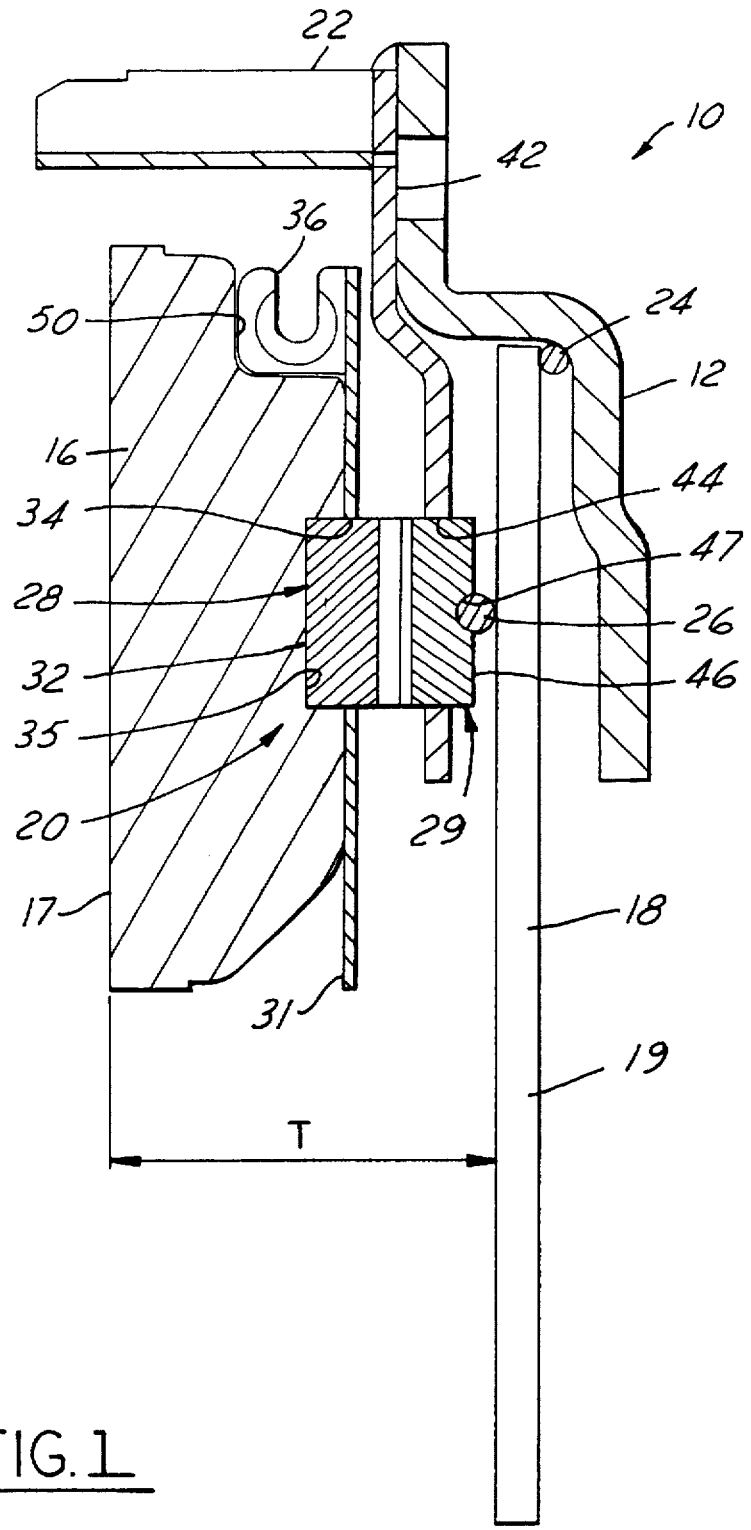
FIG. 1 is a sectional view of a portion of a clutch assembly incorporating the present invention.

A clutch assembly 10, illustrated in FIG. 1, includes a clutch cover 12 having an axis of rotation 14 and a pressure plate 16 concentric with axis 14. Pressure plate 16 has an engagement surface 17 disposed opposite clutch cover 12. A diaphragm spring 18 is disposed between cover 12 and pressure plate 16. A lower or lever portion 19 of diaphragm spring 18 is acted on by a clutch release bearing (not shown). This lever portion can be analogized to a lever of a lever type clutch with coil springs instead of a diaphragm spring.

An adjusting mechanism 20 is disposed between diaphragm spring 18 and pressure plate 16.

A clutch cover spacer 22 extends in an axial direction from clutch cover 12 beyond engagement surface 17 of pressure plate 16 for engagement with a flywheel (not shown). Clutch cover spacer 22 maintains clutch cover 12 at a predetermined distance from the flywheel.

A fulcrum ring 24 is disposed between diaphragm spring 18 and clutch cover 12 at an outer diameter of diaphragm spring 18. Fulcrum ring 20 is formed of wire and serves to provide a consistent reaction point for diaphragm spring 18 against clutch cover 12. A loading ring 26 defining an actuating feature is disposed between diaphragm spring 18 and adjusting mechanism 20.

Adjusting mechanism 20 includes a rotating cam ring 28 disposed against pressure plate 16, a stationary cam ring 29 disposed against clutch cover 12, and an adjusting mechanism tension spring 30, serving as a torsion bias spring, disposed between rotating cam ring 28 and pressure plate 16. While a tension spring is shown here, the system can be configured to employ other types of springs to induce the desired torsional bias, including a compression spring.

Rotating cam ring 28 has as its principal component, a cam drive plate 31. Six rotating cam segments 32, each of the segments being arcuate ramps or inclines, and separate and discrete from one another, are located in segment apertures 34 in plate 31. It should be appreciated that the number of segments and segment apertures can be varied from six. In an alternative embodiment, shown in FIGS. 4-6, four segments are employed. Segments 32 are precisely positioned within apertures 34 by the close fitting relationship between the two parts and are retained therein by a press fit relationship, welding, or other suitable means. A lower side of rotating cam segments 32 are slidably disposed in a pressure plate cam channel 35 on a side of pressure plate 16 opposite engagement surface 17. A spring seat tab 36 extends from drive plate 31 and is configured to receive a first catch plate or end of spring 30. A positioning tab 38 extends radially inward from an inner diameter of drive plate 31. Positioning tab 38 is used to reposition rotating cam ring 28 relative to stationary cam ring 29 as required as servicing the clutch assembly. Additionally, an indicator tab (not shown) could also be provided on drive plate 31 to be used as an indicator of clutch wear.

Stationary cam ring 29 includes a stationary cam support plate 42 which is welded to cover 12 as shown in FIG. 1. Stationary cam 29 has six apertures 44 analogous to segment apertures 34 in rotating cam ring 28. Apertures 44 are sized to receive and precisely locate stationary cam segments 46, which are able to axially slide therein. Stationary cam segments 46 are arcuate incline segments which axially engage rotating cam segments 32 to control the spacing between pressure plate 16 and cover 12 and spring 18. Of course, in embodiments having other than six cam segments 32, the number of stationary cam segments 46 and associated apertures 44 would correspondingly vary. Additionally, stationary cam segments 46 may be formed integral with the stationary cam ring.

Pressure plate 16 has a spring groove 50 in an arcuate portion of its outer periphery which receives both spring seat tab 36 and tension spring 30. A second catch plate 52 is received by a seat notch 54 in pressure plate 16.

Adjusting mechanism 20 operates in the following manner. In an engaged position, as shown in FIG. 1, diaphragm spring 18 acts against stationary cam segments 46, and through them against rotating cam segments 32. Rotating cam segments 32 in turn react against pressure plate 16 which forces the driven disc against the flywheel. With the force of diaphragm spring 18 pressing the cam segments 32 and 46 against each other, frictional forces therebetween prevent relative rotation of cam drive plate 31 and the accompanying cam segments 32. When the clutch is released, as when the vehicle operator depresses a clutch pedal, an inner diameter of diaphragm spring 18 proximate to axis 14 is displaced rearward, or to the right, as shown in FIG. 1. Cam segments 32 and 46 are consequently unloaded, enabling tension spring 30 to index rotating cam ring 28 to compensate for any wear of the driving disc which may have occurred. As a result, an effective thickness T between pressure plate engagement surface 17 and an actuating feature on an opposite side of the pressure plate 16 established by a point of contact between diaphragm spring 18 and loading wire 26 is increased. Stationary cam segments 46 translate axially within cam apertures 44 relative to support plate 42 to accommodate the change in dimension T. Rotating cam segments 32 are rotatably displaced by the force of tension spring 30 acting on spring seat tab 32 of drive plate 31.

A second embodiment of the adjusting mechanism 20 is shown in FIG. 3. While pressure plate 16 and the spring 30 are unchanged, a modified rotating cam ring 60 is employed. Rotating cam ring 60 consists of six direct link cam segments 62 which engage each other without requiring a drive plate. A linking tab 64 on a first end of each cam segment 62 is disposed in a linking notch 66 of an adjacent cam segment 62. One cam segment 62 includes a spring seat tab 68 and a positioning tab 70 which have the same function as the corresponding features of rotating cam ring 28. As with rotating cam ring 28, rotating cam ring 60 has a lower portion slidable disposed in pressure plate cam channel 35.

A second embodiment of a stationary cam ring 72 is substantially similar to stationary cam ring 29, except for the substitution of direct link stationary cam segments 74 in the place of stationary cam segments 46. Direct link stationary cam segments 74 are able to float as a unit in an axial direction relative to support plate 76. Similar to direct link cam segments 62, direct link stationary cam segments 74 have linking tabs 78 and linking notches 80 at opposite ends for engagement with adjacent stationary cam segments 74.

A third embodiment of the invention is shown in FIGS. 4–6. A clutch assembly 82 includes a clutch cover 84 having an axis of rotation 85 and a pressure plate 86 concentric with axis of rotation 85. Diaphragm spring 18 is disposed between cover 84 and pressure plate 86. A third embodiment of an adjusting mechanism 90 includes a stationary cam ring 92 and a rotating cam ring 94. Stationary cam ring 92 is formed integral with pressure plate 86 and includes four arcuate incline segments 93. Rotating cam ring 94 includes a stamped steel ring 96 to which are fixed four interlocking cam segments 98 by rivets 100 passing therethrough. Cam segments 98 are circumferentially linked by integral locking features 99 having a dovetail shape. Each of the cam segments 98 includes an arcuate incline segment 101 in engagement with arcuate incline segments 93 of pressure plate 86.

The stamped steel ring 96 has four circumferentially extending arcuate retention fingers 102 evenly spaced around axis 85. A compression spring 104 is disposed over each of fingers 102. An adjustment pin 106 is slidably disposed over fingers 102, trapping spring 104 on finger 102 as shown in FIG. 5.

Pins 106 are also in press-fit engagement with apertures in pressure plate 86. Pins 106 have a substantially rectangular cross section to prevent rotation. A fulcrum portion or an actuating feature 108 of adjusting mechanism 90 engages diaphragm spring 18. Adjusting mechanism 90 operates essentially the same as adjusting mechanism 20. However, in adjusting mechanism 90 the rotating cam ring, not the stationary cam ring, includes actuating feature 108. Additionally, rotating cam ring 94 is disposed, not against pressure plate 86, but against diaphragm spring 18. Additionally, the press fit relationship between pins 106 and pressure plate 86 causes an upper portion of pins 106 to limit the adjustment of adjusting mechanism 90. Adjustment occurs only after the driven disc 110 has worn sufficiently so that when the clutch is engaged, the force of the diaphragm spring causes pins 106 to move within pressure plate 86.

Preferred embodiments have been disclosed. However, a worker of ordinary skill in the art would realize that certain modifications would come within the teaching of this invention. For example, it may be desirable to have an alternative means for linking the cam segments of the second embodiment. Additionally, it may be desirable for some applications to not provide a positioning tab. The following claims should be studied in order to determine the true scope and content of the invention.

We claim:

1. A clutch assembly having an automatic adjusting mechanism comprising:

a clutch cover having an axis of rotation:

a pressure plate concentric with the axis of rotation and having an engagement surface disposed opposite the clutch cover:

an actuating lever disposed between the clutch cover and the pressure plate:

a rotating cam ring assembly having a backside disposed toward the pressure plate and being concentric with the axis of rotation and including a plurality of discrete arcuate incline segments rigidly connected to each other.

a spring engagement feature fixed relative to at least one of the arcuate incline segments and a first plate having openings precisely sized to receive the incline segments of the rotating cam ring and having the incline segments of the rotating cam ring disposed therein;

a stationary cam ring concentric with the axis of rotation and having a back side defining an actuating feature of the pressure plate with the actuating feature in engagement the actuating lever and the stationary cam ring being rotatively fixed relative to the clutch cover and having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface:

a torsional bias spring disposed between the rotating cam ring and the pressure plate biasing the rotating cam relative to the stationary cam in a direction tending to increase the effective thickness of the pressure plate.

2. A clutch assembly as claimed in claim 1 wherein the incline segments of the stationary cam ring are discrete elements and a second plate has openings precisely sized to slidably receive the incline segments of the stationary cam ring and has the incline segments of the stationary cam ring disposed therein.

3. A clutch assembly as claimed in claim 2, wherein the incline segments of the stationary cam ring are discrete elements having integral locking features for engagement therebetween, the segments alone defining the stationary cam ring.

4. A clutch assembly having an automatic adjusting mechanism comprising:

a clutch cover having an axis of rotation;

a pressure plate concentric with the axis of rotation and having an engagement surface disposed opposite the clutch cover;

an actuating lever disposed between the clutch cover and the pressure plate;

a rotating cam ring assembly having a backside disposed toward one of the pressure plate and the actuating lever and being concentric with the axis of rotation and including a plurality of discrete arcuate incline segments rigidly connected to each other, the incline segments of the rotating cam ring have integral locking features for engagement therebetween, the segments alone defining the rotating cam ring, a spring engagement feature fixed relative to at least one of the arcuate incline segments;

a stationary cam ring concentric with the axis of rotation and having a back side in engagement with the other of the pressure plate and the actuating lever rotatively fixed relative to the clutch cover and having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface;

a torsional bias spring disposed between the rotating cam ring and the pressure plate biasing the rotating cam relative to the station arm cam in a direction tending to increase the effective thickness of the pressure plate.

5. A clutch assembly having an automatic adjusting mechanism comprising:

a clutch cover having an axis of rotation;

a pressure plate concentric with the axis of rotation and having an engagement surface disposed opposite the clutch cover;

an actuating lever disposed between the clutch cover and the pressure plate;

a rotating cam ring assembly having a backside disposed toward one of the pressure plate and the actuating lever and being concentric with the axis of rotation and including a plurality of discrete arcuate incline segments rigidly connected to each other, a spring engagement feature fixed relative to at least one of the arcuate incline segments;

a stationary cam ring concentric with the axis of rotation and having a back side in engagement with the other of the pressure plate and the actuating lever rotatively fixed relative to the clutch cover and having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface;

a torsional bias spring disposed between the rotating cam ring and the pressure plate biasing the rotating cam relative to the stationary cam in a direction tending to increase the effective thickness of the pressure plate and the pressure plate being engaged by a second end of the spring and the pressure plate having an arcuate groove receiving the spring, the arcuate spring groove being radially offset from the cam rings.

6. A clutch assembly having an automatic adjusting mechanism comprising:

a clutch cover having an axis of rotation;

a pressure plate concentric with the axis of rotation and having an engagement surface disposed opposite the clutch cover;

an actuating lever disposed between the clutch cover and the pressure plate;

a rotating cam ring assembly having a backside disposed toward the actuating lever and the rotating cam ring assembly being concentric with the axis of rotation and the rotating cam ring defining an actuating feature disposed toward the actuating lever and the rotating cam ring including a plurality of discrete arcuate incline segments rigidly connected to each other and the discrete arcuate incline segments having integral locking features for engagement therebetween and the discrete arcuate incline segments also being fixed to a metal ring wherein the metal ring includes an arcuate finger and the torsional bias spring is a compression spring disposed over the fingers, and a spring engagement feature fixed relative to at least one of the arcuate incline segments;

an adjustment pin slidably disposed over the arcuate fingers and the pin being engaged by an end of the compression spring;

a stationary cam ring concentric with the axis of rotation and having a back side in engagement with the pressure plate and the stationary cam ring being rotatively fixed relative to the clutch cover and the stationary cam ring having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface; and a torsional bias spring disposed between the rotating cam ring and the pressure plate biasing the rotating cam relative to the stationary cam in a direction tending to increase the effective thickness of the pressure plate.

7. A clutch assembly as claimed in claim 6 wherein the pin is press fit in an aperture in the pressure plate.

8. A clutch assembly having an automatic adjusting mechanism comprising:

a clutch cover having an axis of rotation;

an axially movable pressure plate concentric with the axis of rotation and having an engagement surface disposed opposite the clutch cover and rotatable fixed to the clutch cover;

a diaphragm spring disposed between the pressure plate and the cover;

an adjusting mechanism disposed between the diaphragm spring and the clutch cover having a rotating cam ring assembly concentric with the axis of rotation and including a plurality of discrete arcuate incline segments and a spring engagement feature fixed relative to at least one of the arcuate incline segments, and a stationary cam ring concentric with the axis of rotation and rotatively fixed relative to the clutch cover and having a plurality of arcuate incline segments in axial engagement with the discrete incline segments of the rotating cam ring wherein relative rotation between the rotating cam ring and the stationary cam ring in a first direction increases the axial spacing between the cover and the pressure plate; and a torsional bias spring disposed between the rotating cam ring and the pressure plate biasing the rotating cam ring assembly relative to the stationary cam ring assembly in a direction tending to increase the axial spacing between the cover and the pressure plate, the torsional bias spring being an elongated tension spring and the pressure plate being engaged by a second end of the spring and the pressure plate having an arcuate spring groove receiving the spring, the arcuate spring groove being radially offset from the cam rings.

9. A clutch assembly having an automatic adjusting mechanism comprising:

a clutch cover having an axis of rotation;

an axially movable pressure plate concentric with the axis of rotation and having an engagement surface disposed opposite the clutch cover and rotatable fixed to the clutch cover;

a diaphragm spring disposed between the pressure plate and the cover;

an adjusting mechanism disposed between the diaphragm spring and the clutch cover having a rotating cam ring assembly concentric with the axis of rotation and including a plurality of discrete arcuate incline segments and a spring engagement feature fixed relative to at least one of the arcuate incline segments, the arcuate incline segments of the rotating cam ring are fixed to a metal ring, the pressure plate including a circumferential channel slot receiving the rotating ring, the arcuate incline segments of the rotating cam ring include integral locking features for engagement therebetween and are also fixed to a metal ring and the metal ring having an arcuate finger and the torsional bias spring being a compression spring disposed over the finger an adjustment pin slidably disposed over the arcuate finger and the pin being engaged by an end of the compression spring and a stationary cam ring concentric with the axis of rotation and rotatively fixed relative to the clutch cover and having a plurality of arcuate incline segments in axial engagement with the discrete incline segments of the rotating cam ring wherein relative rotation between the rotating cam ring and the stationary cam ring in a first direction increases the axial spacing between the cover and the pressure plate; and a torsional bias spring disposed between the rotating cam ring and the pressure plate biasing the rotating cam ring assembly relative to the stationary cam ring assembly in a direction tending to increase the axial spacing between the cover and the pressure plate.

10. A clutch assembly as claimed in claim 9 wherein the pin is press fit in an aperture in the pressure plate.

11. A clutch assembly having an automatic adjusting mechanism comprising:

a clutch cover having an axis of rotation;

a pressure plate concentric with the axis of rotation and having an engagement surface disposed opposite the clutch cover;

an actuating lever disposed between the clutch cover and the pressure plate;

a rotating cam ring assembly having a backside disposed toward one of the pressure plate and the actuating lever and the rotating cam ring assembly being concentric with the axis of rotation and the rotating cam ring including a plurality of discrete arcuate incline segments rigidly connected to each other and the discrete arcuate incline segments having integral locking features for engagement therebetween and the discrete arcuate incline segments also being fixed to a metal ring wherein the metal ring includes an arcuate finger and the torsional bias spring is a compression spring disposed over the finger, and a spring engagement feature fixed relative to at least one of the arcuate incline segments;

an adjustment pin slidably disposed over the arcuate finger defining the spring engagement feature;

a stationary cam ring concentric with the axis of rotation and having a back side in engagement with the other of the pressure plate and the actuating lever and the stationary cam ring being rotatively fixed relative to the clutch cover and the stationary cam ring having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface; and a torsional bias spring disposed between the rotating cam ring and the pressure plate biasing the rotating cam relative to the stationary cam in a direction tending to increase the effective thickness of the pressure plate.

12. A clutch assembly having an automatic adjusting mechanism comprising:

a clutch cover having an axis of rotation;

a pressure plate concentric with the axis of rotation and having an engagement surface disposed opposite the clutch cover;

an actuating lever disposed between the clutch cover and the pressure plate;

a rotating cam ring assembly having a backside disposed toward one of the pressure plate and the actuating cam lever and being concentric with the axis of rotation and including
- a plurality of discrete arcuate incline segments rigidly connected to each other,
- a spring engagement feature fixed relative to at least one of the arcuate incline segments, and
- a first plate having openings precisely sized to receive the incline segments of the rotating cam ring and having the incline segments of the rotating cam ring disposed therein;

a stationary cam ring concentric with the axis of rotation and having a back side in engagement with the other of the pressure plate and the actuating lever rotatively fixed relative to the clutch cover and having a plurality of arcuate incline segments in axial engagement with the discrete incline segments of the rotating cam ring wherein relative rotation between the rotating cam ring and the stationary cam ring in a first direction increases an effective thickness of the pressure plate between the actuating feature and the engagement surface;

a torsional bias spring disposed between the rotating cam ring and the pressure plate biasing the rotating cam relative to the stationary cam in a direction tending to increase the effective thickness of the pressure plate.

* * * * *

UNITED STATES PATENT AND TRADEMARK OFFICE
CERTIFICATE OF CORRECTION

PATENT NO. : 5,791,448
DATED : August 11, 1998
INVENTOR(S) : Gochenour et al

It is certified that error appears in the above-indentified patent and that said Letters Patent is hereby corrected as shown below:

In the claims:

```
Claim 1, column 4, line 55, delete ":" and insert --;--
                  line 58, delete ":" and insert --;--
                  line 60, delete ":" and insert --;--
                  line 65, delete ":" and insert --,--.
                  line 67, after "segments" and before "and" insert --,--

Claim 1, column 5, line 15, delete ":" and insert --;--

Claim 4, column 5, line 64, delete "station arm" and insert --stationary--
```

Signed and Sealed this

Fifth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO.    : 5,791,448
DATED         : August 11, 1998
INVENTOR(S)   : Gochenour et al.

It is certified that error appears in the above-identified patent and that said Letters Patent is hereby corrected as shown below:

<u>Column 5,</u>
Line 64, reads "relative to the station arm cam in a direction tending to" should read as follows -- relative to the stationary cam in a direction tending to --

Signed and Sealed this

Fifth Day of March, 2002

Attest:

JAMES E. ROGAN
*Attesting Officer*   *Director of the United States Patent and Trademark Office*

(12) REEXAMINATION CERTIFICATE (4721st)
United States Patent
Gochenour et al.

(10) Number: US 5,791,448 C1
(45) Certificate Issued: Jan. 14, 2003

(54) SEGMENTED CAM RINGS FOR AUTOMATED SELF ADJUSTING CLUTCH

(75) Inventors: Daniel V. Gochenour, Auburn, IN (US); Mark Jennings, Auburn, IN (US)

(73) Assignee: Eaton Corporation, Cleveland, OH (US)

Reexamination Request:
No. 90/006,242, Mar. 12, 2002

Reexamination Certificate for:
Patent No.: 5,791,448
Issued: Aug. 11, 1998
Appl. No.: 08/725,783
Filed: Oct. 4, 1996

Certificate of Correction issued Jan. 5, 1999.
Certificate of Correction issued Mar. 5, 2002.

(51) Int. Cl.$^7$ ............................................... F16D 13/75
(52) U.S. Cl. .................................. 192/70.25; 192/111 A
(58) Field of Search ........................... 192/70.25, 89.24, 192/111 A

(56) References Cited

U.S. PATENT DOCUMENTS

| | | |
|---|---|---|
| 2,251,366 A | 8/1941 | Miller et al. |
| 4,260,047 A | 4/1981 | Nels |
| 4,449,621 A | 5/1984 | Geppert |
| 5,320,205 A | 6/1994 | Kummer et al. |
| 5,419,418 A | 5/1995 | Uenohara et al. |
| 5,450,934 A | 9/1995 | Maucher |
| 5,513,735 A | 5/1996 | Uenohara |
| 5,513,736 A | 5/1996 | Mizukami |
| 5,566,804 A | 10/1996 | Gochenour et al. |
| 5,634,541 A | 6/1997 | Maucher |

*Primary Examiner*—Richard M. Lorence

(57) ABSTRACT

A clutch assembly with an automatically adjusting mechanism includes a clutch cover, a pressure plate, an actuating lever, a rotating cam ring, a stationary cam ring, and an adjusting spring disposed between the rotating cam ring and the clutch cover. The clutch cover has an axis of rotation. The pressure plate is concentric with the axis of rotation and has an engagement surface disposed opposite the clutch cover. The actuating lever is disposed between the clutch cover and the pressure plate. The rotating cam ring assembly is also concentric with the axis of rotation and includes a plurality of discrete arcuate incline segments, as well as a spring engagement feature fixed relative to at least one of the arcuate incline segments. The stationary cam ring is also concentric with the axis of rotation and is rotatably fixed relative to the clutch cover. The stationary cam ring has a backside in engagement with one of the pressure plate and the actuating lever. The stationary cam ring has a plurality of arcuate incline segments which are in axial engagement with the discrete incline segments of the rotating cam ring. Relative rotation between the rotating cam ring and the stationary cam ring in a first direction increases an effective thickness of the cover and the pressure plate. A torsional bias spring is disposed between the rotating cam ring and the clutch cover and biases the rotating cam ring relative to the stationary cam in a direction tending to increase the effective thickness of the pressure plate.

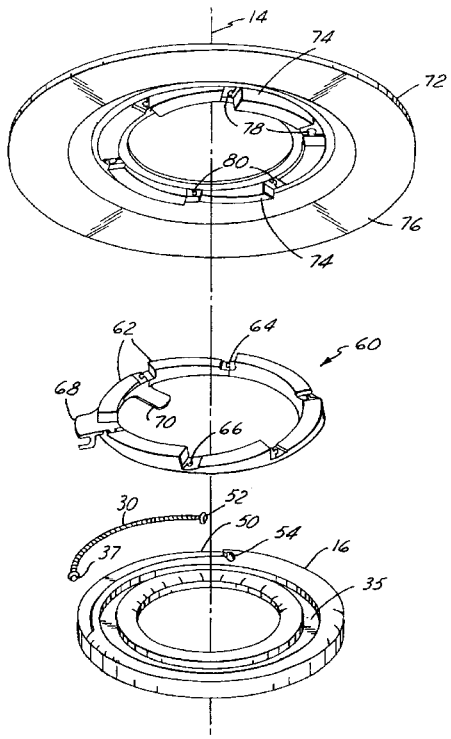

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *